(12) United States Patent
Kim et al.

(10) Patent No.: US 10,525,504 B2
(45) Date of Patent: Jan. 7, 2020

(54) FUNCTIONAL COATINGS ENHANCING CONDENSER PERFORMANCE

(71) Applicant: The Board of Regents of the Nevada System of Higher Education on Behalf of the University of Nevada, Las Vegas, NV (US)

(72) Inventors: Kwang J. Kim, Henderson, NV (US); Bong June Zhang, Chestnut Hill, MA (US); Hyungkee Yoon, Jejusi (KR)

(73) Assignee: The Board of Regents of the Nevada System of Higher Education on behalf of the University of Nevada, Las Vegas, Las Vegas, NV (US)

( * ) Notice: Subject to any disclaimer, the term of this patent is extended or adjusted under 35 U.S.C. 154(b) by 18 days.

(21) Appl. No.: 15/395,300

(22) Filed: Dec. 30, 2016

(65) Prior Publication Data

US 2017/0108295 A1    Apr. 20, 2017

Related U.S. Application Data

(62) Division of application No. 14/268,757, filed on May 2, 2014, now abandoned.

(60) Provisional application No. 61/818,631, filed on May 2, 2013.

(51) Int. Cl.

| | | |
|---|---|---|
| *B05D 7/22* | (2006.01) | |
| *B05D 3/10* | (2006.01) | |
| *B05D 1/18* | (2006.01) | |
| *B05D 3/12* | (2006.01) | |
| *B05D 5/00* | (2006.01) | |
| *B05D 7/14* | (2006.01) | |
| *F28F 13/18* | (2006.01) | |
| *F28F 21/08* | (2006.01) | |
| *B01D 5/00* | (2006.01) | |

(52) U.S. Cl.
CPC .......... *B05D 7/222* (2013.01); *B01D 5/0003* (2013.01); *B05D 1/18* (2013.01); *B05D 1/185* (2013.01); *B05D 3/102* (2013.01); *B05D 3/12* (2013.01); *B05D 5/00* (2013.01); *B05D 7/146* (2013.01); *B05D 7/22* (2013.01); *F28F 13/182* (2013.01); *F28F 13/185* (2013.01); *F28F 13/187* (2013.01); *F28F 21/085* (2013.01); *F28F 21/089* (2013.01); *F28F 2245/04* (2013.01)

(58) Field of Classification Search
CPC .......... F28F 13/04; F28F 13/18; F28F 13/182; F28F 13/185; F28F 13/187; F28F 21/085; F28F 21/089; F28F 2245/04; B05D 3/102; B05D 3/12; B05D 5/00; B05D 7/146; B05D 7/22; B05D 7/222
See application file for complete search history.

(56) References Cited

U.S. PATENT DOCUMENTS

| | | |
|---|---|---|
| 2,974,404 A | 3/1961 | Humenik, Jr. et al. |
| 3,613,779 A | 10/1971 | Brown |
| 4,216,819 A | 8/1980 | Notaro |
| 4,917,960 A | 4/1990 | Hornberger et al. |
| 5,945,158 A | 8/1999 | Djokic et al. |
| 6,090,489 A | 7/2000 | Hayakawa et al. |
| 6,863,991 B1 | 3/2005 | Coe et al. |
| 2003/0159362 A1 | 8/2003 | Singh et al. |
| 2006/0219598 A1 | 10/2006 | Cody et al. |
| 2010/0096113 A1* | 4/2010 | Varanasi ............... F28F 13/187 165/133 |
| 2010/0143741 A1 | 6/2010 | Bell et al. |
| 2010/0294475 A1 | 11/2010 | Rush et al. |
| 2011/0171373 A1 | 7/2011 | Lee et al. |
| 2015/0048526 A1 | 2/2015 | Kim et al. |

FOREIGN PATENT DOCUMENTS

| | | |
|---|---|---|
| DE | 102007008038 A1 | 9/2008 |
| JP | S608057 A | 1/1985 |
| JP | 08285491 A | 11/1996 |
| JP | 09243282 A | 9/1997 |
| JP | 2001200373 A | 7/2001 |
| JP | 2004176984 A | 6/2004 |
| JP | 2005257257 A | 9/2005 |
| JP | 2007523894 A | 8/2007 |
| JP | 2012241283 A | 12/2012 |
| WO | 9723572 A1 | 7/1997 |
| WO | 2007068760 A2 | 6/2007 |
| WO | 2012118805 A2 | 9/2012 |
| WO | 2014064450 A1 | 5/2014 |

OTHER PUBLICATIONS

Gu et al., Micro/Nanobinary Structure of Silver Films on Copper Alloys with Stable Water-Repellent Property under Dynamic Conditions, Langmuir 2009, 25(20), 12299-12307. (Year: 2009).*
Law, K., "Definitions for Hydrophilicity, Hydrophobicity, and Superhydrophobicity: Getting the Basics Right," J. Phys. Chem. Lett. 2014, 5, 686-688. (Year: 2014).*
Zhang et al.; Dropwise steam condensation on various hydrophobic surfaces; Polyphenylene sulfide (PPS), polytetrafluoroethylene (PTFE); and self-assembled micronano silver (SAMS); International Journal of Heat and Mass Transfer; Jun. 2015; pp. 353-358; vol. 89.
Search Report for European Patent Application No. 17209826.1; dated May 7, 2018.
Baojin et al.; Experimental study on condensation heat transfer of steam on vertical titanium plates with different surface energies; Experimental Thermal and Fluid Science; Jan. 2011; pp. 211-218; vol. 35, No. 1.
Beverly et al.; Effects of Size Dispersion Disorder on the Change Transport in Self-Assembled 2-D Ag Nanoparticle Arrays; 2002; J. Phys. Chem. B.; pp. 2131-2135; vol. 106.

(Continued)

*Primary Examiner* — William P Fletcher, III
(74) *Attorney, Agent, or Firm* — Barnes & Thornburg LLP; Jason A. Bernstein

(57) ABSTRACT

Coatings for enhancing performance of materials surfaces, methods of producing the coating and coated substrates, and coated condensers are disclosed herein. More particularly, exemplary embodiments provide chemical coating materials useful for coating condenser components.

8 Claims, 15 Drawing Sheets

(56) References Cited

OTHER PUBLICATIONS

Gu et al.; Micro/Nanobinary Structure of Silver Films on Copper Alloys with Stable Water-Repellent Property under Dynamic Conditions; 2009; pp. 12299-12307; vol. 25(20).

Lee et al.; Water droplet evaporation on Cu-based hydrophobic surfaces with nano- and micro-structures; International Journal of Heat and Mass Transfer; 2012; pp. 2151-2159; vol. 55.

Li et al.; Preparation of surface bound silver nanoparticles on polymide by surface modification method and its application on electroless metal deposition; Apr. 2004; Applied Surface Science, pp. 299-306; vol. 233.

Nam et al.; Single bubble dynamics on a super hydrophilic surface with artificial nucleation sites; International Journal of Heat and Mass Transfer; 2011; pp. 1572-1577; vol. 54.

Wang et al.; Size effect on the coalescence-induced self-propelled droplet; Applied Physics Letters; 2011; pp. 053112; vol. 98.

Zhang et al.; Biologically inspired tunable hydrophilic/hydrophobic surfaces: a copper oxide self-assembly multitier approach; Bioinspiration & Biomimetics; 2012; pp. 036011; vol. 7.

International Preliminary Report on Patentability for International Patent Application No. PCT/US2014/036643; dated Nov. 3, 2015.

Search Report and Written Opinion for International Patent Application No. PCT/US2014/036643; dated Sep. 9, 2014.

Search Report for European Patent Application No. 14791063.2; dated Feb. 2, 2017.

Office Action for Japanese Patent Application No. 2016-512075; dated Jul. 10, 2018.

* cited by examiner

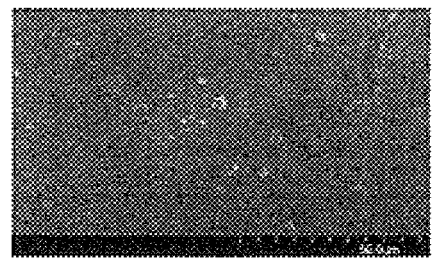
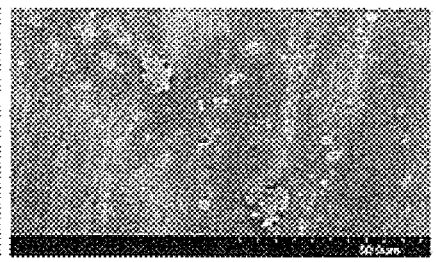
FIG. 3A  FIG. 3B
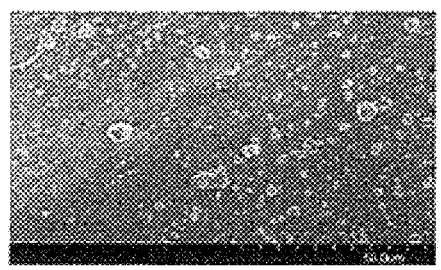
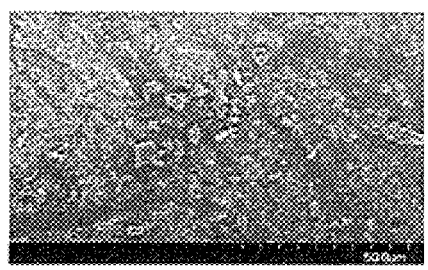
FIG. 3C  FIG. 3D
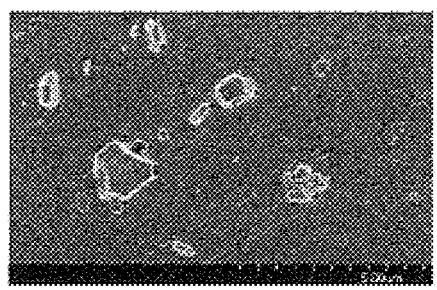
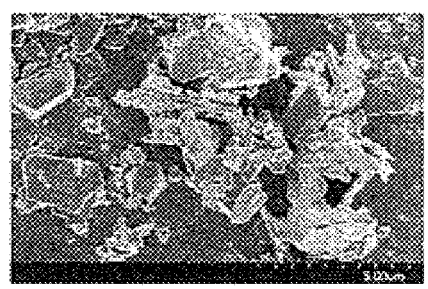
FIG. 3E  FIG. 3F

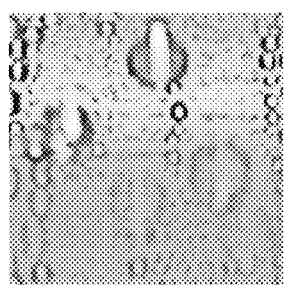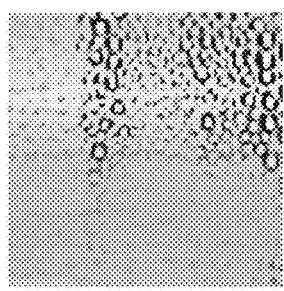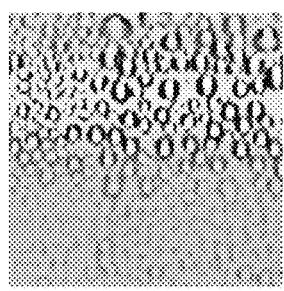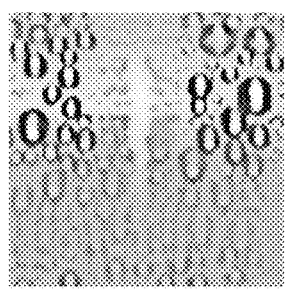
FIG. 13A　　　　FIG. 13C　　　　FIG. 13E　　　　FIG. 13G
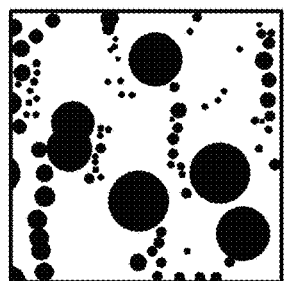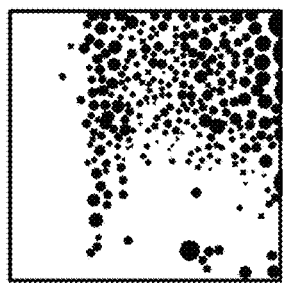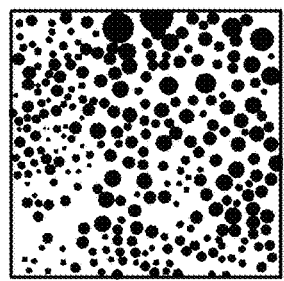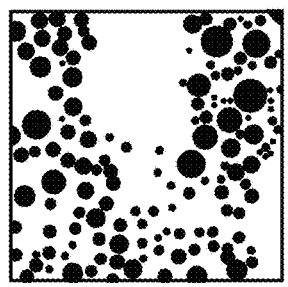
FIG. 13B　　　　FIG. 13D　　　　FIG. 13F　　　　FIG. 13H (e) 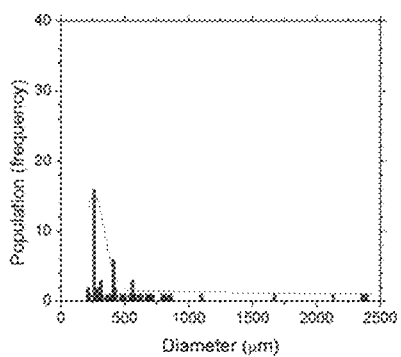 (f) (g) 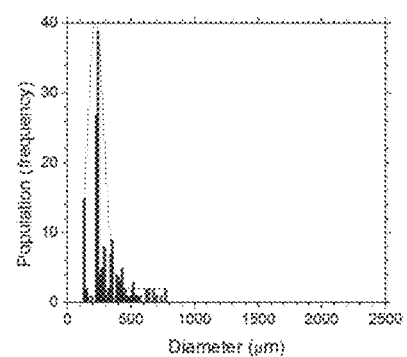 (h)
FIG. 13I  FIG. 13J
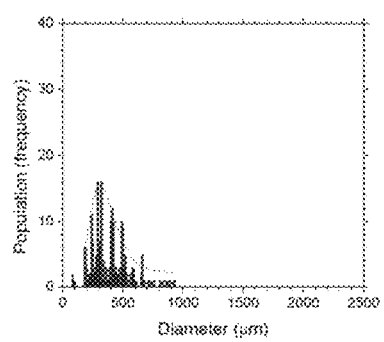 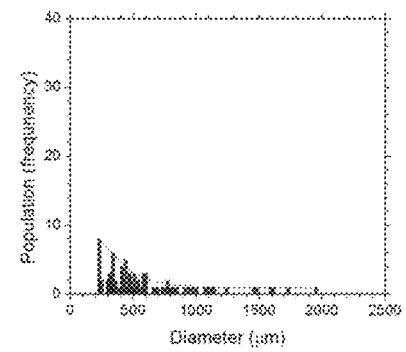
FIG. 13K  FIG. 13L

FUNCTIONAL COATINGS ENHANCING CONDENSER PERFORMANCE

CROSS REFERENCE TO RELATED APPLICATIONS

This application is a divisional of co-pending U.S. patent application Ser. No. 14/268,757, filed May 2, 2014, which claims the benefit of U.S. Provisional Patent Application Ser. No. 61/818,631, filed May 2, 2013, the disclosures of which are incorporated herein by reference in their entirety.

FIELD

The present invention disclosure relates to the field of coatings for enhancing performance of materials surfaces. More particularly, exemplary embodiments provide chemical coating materials useful for coating condenser components.

BACKGROUND

The effect of surfaces on changes of state in materials, including condensation, boiling, freezing and thawing have long been appreciated and investigated in the art. With the advent of microtechnology and nanotechnology, even smaller scale implications of surface structure, composition, porosity and texture have been evaluated and determined.

SUMMARY

Heat-transfer surfaces are provided with metal or polymer-based porous coatings to alter condensation and heat transfer properties on, from and to those surfaces. The polymers-based particles may have number average diameters of between 50 nm and 5 microns and may further contain additives to further modify the physical properties of the polymer-based particles or to alter chemical properties to resist deterioration of the particles during use. The surfaces of the metal particles may be in the form of oxides or may be coated in a manner to minimize reduction in thermal transfer properties. Better tailoring of hydroscopic or hygroscopic surface properties of the particles is enabled.

In exemplary embodiments, a condenser system is provided comprising at least one vapor condensing surface having metal or polymer-based particles distributed across the surface of the vapor-condensing surface to form a porous coating on the vapor-condensing surface. The particles preferably have an average size distribution within a range of ±100, ±50% or ±20% within an average size range of 50 nm to 5 μm, or within 100 nm to 3 μm. The particles may provide a static water contact angle (SWCA) on the vapor-condensing surface of between 90 to 160 degrees or 100 and 160 degrees with deionized water at a temperature of 70-90° C.

BRIEF DESCRIPTION OF THE FIGURES

FIG. 3A is a SEM image of silver self-assembly on the primary surface-treated copper in a silver nitrate solution concentration of 1 mM.

FIG. 3B is a SEM image of silver self-assembly on the primary surface-treated copper in a silver nitrate solution concentration of 10 mM.

FIG. 3C is a SEM image of silver self-assembly on the primary surface-treated copper in a silver nitrate solution concentration of 100 mM.

FIG. 3D is a SEM image of silver self-assembly on the primary surface-treated copper in a silver nitrate solution concentration of 100 mM for 20 sec.

FIG. 3E is a higher magnification SEM image of silver self-assembly on the primary surface-treated copper of FIG. 3A.

FIG. 3F is a high magnification SEM image of silver self-assembly on the primary surface-treated copper of FIG. 3D.

FIG. 13A is schematic illustration of a spatial condensate (contour) distribution at one time frame of a silver-coated surface. In order to estimate the diameter, the condensate contour was obtained from a video recorded image. The condensate perimeter was then estimated by ImageJ analysis with a still frame taken at 4.2 seconds.

FIG. 13B is a schematic illustration of the corresponding condensate population of FIG. 13A at one time frame of a silver-coated surface. In order to estimate the diameter, the condensate contour was obtained from video recorded images. The condensate perimeter was then estimated by ImageJ analysis with a still frame taken at 4.2 seconds.

FIG. 13C is a schematic illustration of the spatial condensate (contour) distribution at a second time frame of a silver-coated surface. In order to estimate the diameter, the condensate contour was obtained from a video recorded image. The condensate perimeter was then estimated by ImageJ analysis with a still frame taken at 4.9 seconds.

FIG. 13D is a schematic illustration of the corresponding condensate population of FIG. 13C at one time frame of a silver-coated surface. In order to estimate the diameter, the condensate contour was obtained from video recorded images. The condensate perimeter was then estimated by ImageJ analysis with a still frame taken at 4.9 second seconds.

FIG. 13E is a graph of the spatial condensate (contour) distribution at a third time frame of a silver-coated surface. In order to estimate the diameter, the condensate contour was obtained from a video recorded image. The condensate perimeter was then estimated by ImageJ analysis with a still frame taken at 5.3 seconds.

FIG. 13F is a graph of the corresponding condensate population of FIG. 13E at one time frame of a silver-coated surface. In order to estimate the diameter, the condensate contour was obtained from video recorded images. The condensate perimeter was then estimated by ImageJ analysis with a still frame taken at 5.3 seconds.

FIG. 13G is a graph of the spatial condensate (contour) distribution at a fourth time frame of a silver-coated surface. In order to estimate the diameter, the condensate contour was obtained from a video recorded image. The condensate perimeter was then estimated by ImageJ analysis with a still frame taken at 5.8 seconds.

FIG. 13H is a graph of the corresponding condensate population of FIG. 13G at one time frame of a silver-coated surface. In order to estimate the diameter, the condensate contour was obtained from video recorded images. The condensate perimeter was then estimated by ImageJ analysis with a still frame taken at 5.8 seconds.

FIG. 13I is a population histogram estimated from the still frame of FIGS. 13A and 13B.

FIG. 13J is a population histogram estimated from the still frame of FIGS. 13C and 13D.

FIG. 13K is a population histogram estimated from the still frame of FIGS. 13E and 13F.

FIG. 13L is a population histogram estimated from the still frame of FIGS. 13G and 13H.

DETAILED DESCRIPTION

Described herein are embodiments of coating materials, methods of forming the coating materials, methods of coating a substrate, surfaces (e.g., a condenser surface) coated with the coating materials, and a coated article formed by methods disclosed herein. Instead of forming a film on a surface, water forms as droplets on coated surfaces as described herein.

In an illustrative embodiment, a coating of a metal substrate (i.e., a transition metal) includes bound or embedded metal particles and at least one layer of polymer. In an embodiment, a metal substrate includes copper, zinc, nickel, iron, aluminum, and alloys thereof. In an embodiment, metal particles can be nano particles. In an embodiment, the metal particles can be of an average size of 200 nm to 3 µm. The metal substrate can be treated and then immersed in an aqueous solution comprising the metal particles (e.g., a silver solution, e.g., $AgNO_3$). In an embodiment, metal particles (e.g., silver or gold) coat and/or embed into the surface of the metal substrate. In an embodiment, a polymer or combination of polymers coat a surface of the treated metal. Thereby, a polymer or a combination of polymers coats a surface that is embedded or bound with metal particles. In an embodiment, the surface is an inside surface, an outside surface, or both inside and outside surfaces. In an embodiment, a copper or copper alloy substrate includes silver self-assembled nano particles bound to the surface and further coated with a polymer.

A polymer should be stable to a moist environment so that a robust condensing surface is provided. Polymers may vary across the spectrum of hydrophilicity and hydrophobicity and may include fluorinated polymers (e.g., perfluorinated polymers of halogenated polymers comprising at least 25% by number of the halogen atoms as fluorine), olefinic polymers, sulfonated hydrocarbon polymers, phosphonated hydrocarbon polymers, silicone polymers and the like.

Among specific polymers identified are poly(phenylene-sulfide), polytetrafluorethylene, and the like. Other classes of polymers useful in the practice of the present technology may include, by way of non-limiting examples, silicone polymers, polysiloxanes, and the like.

In an illustrative embodiment, the thickness of the coating on a surface is less than about 2 µm, about 1.9 µm, about 1.8 µm, about 1.7 µm, about 1.6 µm, about 1.5 µm, about 1.4 µm, about 1.3 µm, about 1.2 µm, about 1.1 µm, about 1 µm, about 975 nm, about 950 nm, about 925 nm, about 900 nm, about 875 nm, about 850 nm, about 825 nm, about 800 nm, about 775 nm, about 750 nm, about 725 nm, or about 700 nm.

Figure 1A:
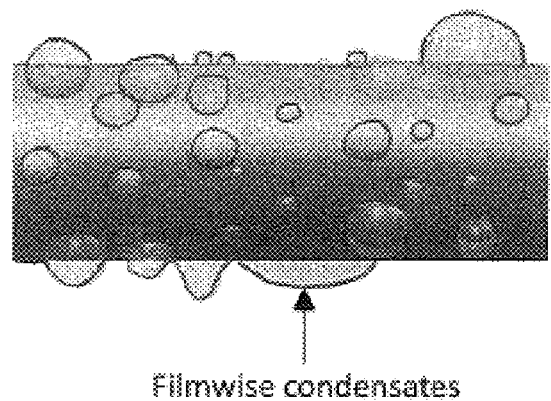
FIG. 1(a) is a schematic view of an image of a film-wise condensate mode.

Properly promoted "drop-wise" condensation ("DWC") has been known to improve substantially Condensation Heat Transfer Coefficient ("CHTC") compared to that of the traditional "film-wise" condensation ("FWC") (A. K. Das, H. P. Kilty, Marto, ASME J. Heat Transfer 7, 109 (2000)). As schematically illustrated in FIG. 1(a), representing an FWC mode, a large portion of liquid condensate with poor thermal conductivity hampers efficient heat transfer passage. Residing liquid film prevents refreshing the surface and nucleating liquid condensates.

Figure 1B:
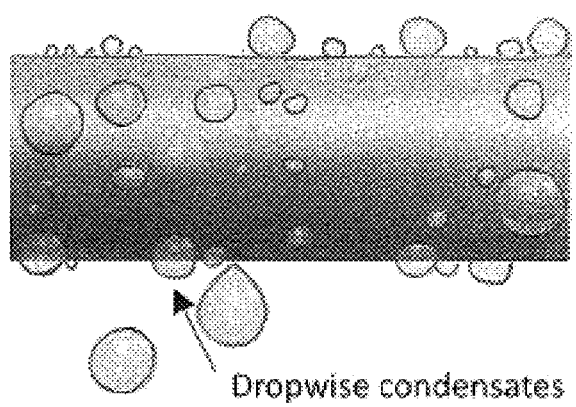
FIG. 1(b) shows a schematic view of an image of a drop-wise condensate.

On the contrary, DWC mode shows discrete rupture of drops/droplets on the heat transfer surface in FIG. 1(b). Drop-shaped condensates roll-off and merge with adjacent premature condensates during sweeping the surface. DWC mode leads to a continuous cycle of condensate nucleation. Eventually, DWC mode increases condensate detachment frequency, which reduces the effect of thermal resistance due to condensate on the heat transfer surface.

A hydrophobic coating with enhanced interfacial tension induces neighboring tiny condensates to coalesce and leads to droplet-shaped condensates. Research has focused on fabrication of a hydrophobic surface/coating with high Water Contact Angle (WCA), which is measured by a sessile drop. For instance, organic coating materials with low surface energy have received considerable attention since it is assumed that hydrophobic capabilities of the coated-surface promote DWC. Due to superhydrophobic WCA (>150°), numerous droplets were shown throughout the axis of the test tubes. However, condensates on the polymer-based coatings rarely rolled-off and resided on the surface until they reached critical radius.

A porous surface with hydrophobic coating escalate its WCA into superhydrophobic regime and shows rolling-off motion (B. J. Zhang, K. J. Kim, H. K. Yoon, Bioinsp. Biomim. 7, 036011 (2012). C. Y. Lee, B. J. Zhang, J. Y. Park, K. J. Kim, Int. J. Heat Mass Transfer 55, 2151 (2012)). During condensation phase change, vapor cluster impinges onto the condensing surface. Numerous condensates fill into the condensing surface. Eventually, condensate drops experience additional drag and lead to longer retention on the surface. Once a condensate surface becomes wet, additional driving forces are needed to be separate out of the condensing surface (F. C. Wang, F. Yang, Y. P. Zhao, Appl. Phys. Lett. 98, 053112 (2011)).

Thus, coatings and coated surfaces as described herein achieve DWC augmentation. A silver nano particle deposited coating (i) has low surface energy, (ii) reduces liquid drag, and (iii) can optimize silver nano-particles for condensation. These features promote effective DWC and lead to a substantial DWC enhancement by increasing nucleating sites and liquid condensate detachment frequency.

The metal particles may be any metal or metalloid that can form and maintain solid particles within the operating temperature range (about 20° C. to about 280° C. depending on the type of material) of vapors and liquids to which they will be subjected during use. The ability to form thin, oxide coatings on the surface that will resist deep oxidation of the metal is desirable, but not essential. Given that background, metals/metalloids and alloys thereof such as aluminum, chromium, copper, chrome-steel, stainless steel, iron, tin, titanium, or a combination thereof can coat the inside, outside, or both the inside and outside of tubes/tubing and fins used in various condensation applications.

The size range of the particles may vary over an average size range of 50 nm to 5 µm, as stated above. Both smaller and larger average diameter particles and averages may be used with varying efficiencies.

The particles may be bound to the surface of the condenser plate by fusion of the polymeric surface of the particles to the condenser surface, a coating provided on the particles bonding the particles to the condenser plate surface (the coating must provide the surface properties to the particles that offer the benefits of the technology) or a thin adhesive layer may be present on the condenser plate to cause the particles to adhere to that surface.

There are various general characteristics that can be discussed within the concept of non-limiting estimations of general, but not exclusive attributes, dimensions, parameters and specifications within which the present technology may be discussed. The thickness of the coatings may be in similar ranges, although with smaller particles, multi-particle layer thickness is more desirable, while with the larger diameter size particles (e.g., 750 nm to 5 µm), mono-particle layer thicknesses can be more useful. As shown in FIGS. 3A-F, the SEM images show a thickness of the particle coatings of 1-2 µm.

The coating may be a monolayer or multiple-particle layer of the metal, metalloid, or alloy substrate as described herein. A coating can include a polymer or material comprising a silane or thiol end group. One coating that can be used is 1-dodecanethiol, which consists of saturated carbon backbone with a thiol (—SH) group. In ethanolic solution, 1-dodecanethiol does not polymerize with other particles. Once the solution is sprayed out on a metal substrate, a thiol group can interact with hydrogen binding sites on a metal substrate, and in particular metal particles (e.g., silver or gold) coated on or embedded in the substrate. Individual monomers (e.g. 1-dodecanethiol) chemically interact (via covalent interaction) and parallel align with each other, thereby forming single-layered molecular level coating. Thickness of single-layered molecular coating for that particular material, composition and particle size is less or equal to about 1 µm. In an embodiment, the coating thickness is about 750 nm to about 1 µm, about 800 nm to about 1 µm, about 825 nm to about 1 µm, about 850 nm to about 1 µm, about 875 nm to about 1 µm, about 900 nm to about 1 µm, about 925 nm to about 1 µm, about 950 nm to about 1 µm, or about 975 nm to about 1 µm. Coatings as described herein that less or equal to about 1 µm remain durable.

Hydrophobic coatings (1-dodecanethiol) are not exclusively polymer-based. To control surface wetting, hydroxyl group-functionalized coating (mercapto-based) can be used. For dropwise condensation application, hydrophilicity does not need to be considered since it will not help condensation.

An aspect of the disclosure includes a method of forming the coated material. In an embodiment, a metal substrate is contacted with a metal particle solution. In an embodiment, the contacting is substrate immersion in a liquid metal solution. In an embodiment, the metal substrate is copper or a copper alloy. In an embodiment, the metal particle solution is a silver solution. In an embodiment, the silver solution is silver nitrate. In an embodiment, the silver nitrate solution is about 1 to about 100 mM, about 10 to about 100 mM, about 20 to about 100 mM, about 25 to about 100 mM, about 30 to about 100 mM, about 40 to about 100 mM, about 50 to about 100 mM, about 60 to about 100 mM, about 70 to about 100 mM, about 75 to about 100 mM, about 1 to about 50 mM, about 1 to about 75 mM, or about 10 to about 50 mM.

The nano particles in a silver solution can be about 200 nm to about 3 μm. In an embodiment, silver nanoparticles deposited on, coated on, or embedded within a substrate service can be about 200 nm to about 3 μm, 300 nm to about 3 μm, 400 nm to about 3 μm, 500 nm to about 3 μm, 600 nm to about 3 μm, 700 nm to about 3 μm, 800 nm to about 3 μm, 900 nm to about 3 μm, 1 μm to about 3 μm, 2 μm to about 3 μm, about 200 nm to about 2 μm, 300 nm to about 2 μm, 400 nm to about 2 μm, 500 nm to about 2 μm, 600 nm to about 2 μm, 700 nm to about 2 μm, 800 nm to about 2 μm, 900 nm to about 2 μm, 1 μm to about 2 μm, about 200 nm to about 1 μm, 300 nm to about 1 μm, 400 nm to about 1 μm, 500 nm to about 1 μm, 600 nm to about 1 μm, 700 nm to about 1 μm, 800 nm to about 1 μm, or 900 nm to about 1 μm.

In an illustrative embodiment, silver particles are embedded in the surface of the substrate. In an embodiment, the silver particles both cluster on the surface of the substrate and are embedded in the surface of the substrate. The silver particles provide a binding platform for a coating (e.g., coating comprising a silane or thiol end group). In an embodiment, areas of silver on and/or embedded in the surface of the substrate are heavily hydroxylated and can covalently bond to a self-assembly monolayer. In an embodiment, the self-assembly monolayer is a hydrocarbon or fluorocarbon. In an embodiment, the hydrocarbon or fluorocarbon is silane-based or contains a thiol end group.

In an embodiment, the self-assembly monolayer is 1-dodecanethiol. In an embodiment, a copper or copper alloy substrate comprises silver particles clustered on or embedded in at least one surface, and further comprising a self-assembly monolayer of 1-dodecanethiol. In an embodiment, the coated surface provides a water contact angle of about 90° to about 115°, about 95° to about 115°, about 100° to about 115°, about 105° to about 115°, about 90° to about 110°, about 95° to about 110°, about 100° to about 110°, about 101° to about 110°, about 102° to about 110°, about 103° to about 110°, about 104° to about 110°, about 105° to about 110°, about 106° to about 110°, about 107° to about 110°, about 108° to about 110°, or about 109° to about 110°.

In an embodiment, a surface coated as described herein comprises a condensate detachment frequency of about 0.5 Hz to about 2.0 Hz, 0.5 Hz to about 1.9 Hz, 0.5 Hz to about 1.8 Hz, 0.5 Hz to about 1.7 Hz, 0.5 Hz to about 1.6 Hz, 0.5 Hz to about 1.5 Hz, about 0.5 Hz to about 1.4 Hz, about 0.5 Hz to about 1.3 Hz, about 0.5 Hz to about 1.2 Hz, about 0.5 Hz to about 1.1 Hz, 0.6 Hz to about 1.5 Hz, about 0.6 Hz to about 1.4 Hz, about 0.6 Hz to about 1.3 Hz, about 0.6 Hz to about 1.2 Hz, about 0.6 Hz to about 1.1 Hz, 0.7 Hz to about 1.5 Hz, about 0.7 Hz to about 1.4 Hz, about 0.7 Hz to about 1.3 Hz, about 0.7 Hz to about 1.2 Hz, about 0.7 Hz to about 1.1 Hz, 0.8 Hz to about 1.5 Hz, about 0.8 Hz to about 1.4 Hz, about 0.8 Hz to about 1.3 Hz, about 0.8 Hz to about 1.2 Hz, about 0.8 Hz to about 1.1 Hz, 0.9 Hz to about 1.5 Hz, about 0.9 Hz to about 1.4 Hz, about 0.9 Hz to about 1.3 Hz, about 0.9 Hz to about 1.2 Hz, about 0.9 Hz to about 1.1 Hz, about 1 Hz to about 2 Hz, about 1 Hz to about 1.9 Hz, about 1 Hz to about 1.8 Hz, about 1 Hz to about 1.7 Hz, about 1 Hz to about 1.6 Hz, about 1 Hz to about 1.5 Hz, about 1 Hz to about 1.4 Hz, about 1 Hz to about 1.3 Hz, about 1 Hz to about 1.2 Hz, or about 1 Hz to about 1.1 Hz.

Condensation is the change of the physical state of matter from a gaseous phase into a liquid phase, and is the reverse of vaporization. Condensers are used in a variety of technical fields. They may be used for capturing specific vapors, and especially water vapor, from the air, condensing steam in power generation systems, such as nuclear reactors and coal burning generators. The condensation systems may be powered or passive. Among the various types of condensers includes air well or aerial well generators, which are structures or devices that collect water by promoting the condensation of moisture from air. Designs for air wells are many and varied, but the simplest designs are completely passive, require no external energy source and have few, if any, moving parts.

Three principal designs are used for air wells: high mass, radiative and active. High-mass air wells were used in the early 20th century, but the approach failed. From the late 20th century onwards, low-mass, radiative collectors proved to be much more successful. Active collectors collect water in the same way as a dehumidifier; although the designs work well, they require an energy source, making them uneconomical except in special circumstances. New, innovative designs seek to minimize the energy requirements of active condensers or make use of renewable energy resources.

The vanes, blades, coils, tubes, fins, or other condenser surfaces may be metals, alloys, composites, ceramic, metal oxides and the like as known in the art. Such vanes, blades, tubes, fins, coils, or other condenser surfaces may be coated with a coating as described herein.

Coated surfaces as disclosed herein increase energy efficiency of heat transfer materials (e.g., condenser based systems). For example, embodiments of coated surfaces can increase the heat coefficient by changing how water interacts with materials (e.g., a condenser surface). Instead of forming a film on a surface, water forms as droplets on coated surfaces as described herein (e.g., condenser coils). The droplets roll off coated surfaces as described herein faster, thereby allowing new water droplets to form on the surface. Thereby the cycle of droplet formation and collection occurs more quickly. Thus, heat can be removed more efficiently. In embodiments as described herein, the heat coefficient of coated surfaces is 100 to 150% greater than uncoated surfaces.

The disclosed coating can also coat condenser fins, such as those used in air conditioning units. For examples, condenser fins can be located on an outdoor portion of an air conditioner near a compressor. Air conditioner fins can be a part of the condenser that assists heat in moving away from the air conditioner so that the heat disperses more quickly. Condensers with at least one vapor condensing surface coated as disclosed herein, can be included in air conditioning units for multiple applications, such as industrial air conditioners, consumer (e.g., home) air conditioners, automotive air conditioners, aircraft air conditioners, etc. In an embodiment, the water comes off of a coated fin and collected at the bottom and not blown out of the air conditioner.

In an embodiment, condenser systems include at least one coated vapor condensing surface as discussed herein, wherein the surface has a total surface energy of less than about 20 mJ/m$^2$ to about 40 mJ/m$^2$, 25 mJ/m$^2$ to about 40 mJ/m$^2$, 26 mJ/m$^2$ to about 40 mJ/m$^2$, 27 mJ/m$^2$ to about 40 mJ/m$^2$, 28 mJ/m$^2$ to about 40 mJ/m$^2$, 29 mJ/m$^2$ to about 40 mJ/m$^2$, 30 mJ/m$^2$ to about 40 mJ/m$^2$, about 20 mJ/m$^2$ to about 35 mJ/m$^2$, about 25 mJ/m$^2$ to about 35 mJ/m$^2$, about 26 mJ/m$^2$ to about 35 mJ/m$^2$, about 27 mJ/m$^2$ to about 35 mJ/m², about 28 mJ/m² to about 35 mJ/m², about 29 mJ/m² to about 35 mJ/m², about 30 mJ/m² to about 35 mJ/m², about 20 mJ/m² to about 30 mJ/m², about 25 mJ/m² to about 30 mJ/m², about 26 mJ/m² to about 30 mJ/m², about 27 mJ/m² to about 30 mJ/m², about 28 mJ/m² to about 30 mJ/m², about 29 mJ/m² to about 30 mJ/m², about 20 mJ/m² to about 29 mJ/m², 25 mJ/m² to about 29 mJ/m², 26 mJ/m² to about 29 mJ/m², 27 mJ/m² to about 29 mJ/m², 28 mJ/m² to about 29 mJ/m², about 20 mJ/m² to about 28 mJ/m², 25 mJ/m² to about 28 mJ/m², 26 mJ/m² to about 28 mJ/m², or 27 mJ/m² to about 28 mJ/m². In an embodiment, condenser systems include at least one coated vapor condensing surface as discussed herein, wherein the surface has a total surface energy of less than about 40 mJ/m², about 39 mJ/m², about 38 mJ/m², about 37 mJ/m², about 36 mJ/m², about 35 mJ/m², about 34 mJ/m², about 33 mJ/m², about 32 mJ/m², about 31 mJ/m², about 30 mJ/m², about 29 mJ/m², or about 28 mJ/m². In an embodiment, the total surface energy can be calculated according to the formula $\gamma=\gamma^h+\gamma^d$, where $\gamma^h$ is a surface energy component due to a hydrogen bonding and dipole-dipole interactions and $\gamma^d$ is a dispersion component of surface energy. In an embodiment, $$\gamma^h = \left(\frac{137.5 + 256.1\ \cos\theta_{H_2O} - 118.6\ \cos\theta_{CH_2I_2}}{44.92}\right)^2$$

and $$\gamma^d = \left(\frac{139.9 + 181.4\ \cos\theta_{CH_2I_2} - 41.5\ \cos\theta_{H_2O}}{44.92}\right)^2.$$

In an embodiment, the nanoparticle coating on a surface with a total energy as described above is self-assembled. In yet another embodiment, a condenser component (e.g., a fin, a coil, etc.) is coated with silver nanoparticles and/or has silver nanoparticles embedded into a surface and is further coated with a polymer. In an embodiment, the polymer coating is a hydrocarbon or fluorocarbon polymer. In an embodiment, the coating is 1-dodecanethiol.

Condenser systems having at least one coated vapor condensing surface as discussed herein have various applications. Such condenser systems can be utilized in dehumidification, desalination, electric power plants, refrigeration, water generation, and chemical separation processes. For example, water desalination systems typically comprise a) an evaporator for evaporating saline to produce water vapor and b) a condenser for condensing the water vapor. In an embodiment, a water desalination system comprises tubes (e.g., stainless steel) arranged either horizontally or vertically in a condenser-evaporator chamber. The energy to evaporate the water can be obtained from film or drop-wise condensation of desorbed water vapor. A water desalination system can include a condenser system comprising at least one vapor condensing surface coated according to the disclosure herein. In another embodiment, water desalination includes vapor compression where feed water can be preheated (e.g., in a heat exchanger) outside tubes of a condenser-evaporator. After heating (e.g., boiling), the vapor release is compressed and directed to condense inside the tubes of the condenser-evaporator. Such tubes can be according to the disclosure herein.

Condenser systems as disclosed herein can also be utilized in steam power generation (e.g., air-steam, pure steam, etc.). For example, a condenser system as disclosed herein in a steam powered turbine can include an exhaust gas inlet part that introduces turbine exhaust gases containing steam and non-condensable gases. In another embodiment, a geothermal steam turbine comprises a condenser system as disclosed herein. For example, a condensing system as disclosed herein can be connected to a steam jet ejector for condensing geothermal steam into geothermal water including substantially no non-condensed gas by directly contacting the steam to the condensate from the main condenser. In another embodiment, a low pressure condensing steam turbine includes a condenser system as disclosed herein. The condenser converts exhaust back to water and thereby condensation of the steam and the change of the steam from a vapor to water creates a partial vacuum that pulls the exhaust through the last stages of the low pressure turbine. These examples are non-limiting as a condenser system as disclosed herein can be used in a multitude of steam power generators.

In an embodiment, a condenser component is formed by contacting a liquid metal solution to at least one surface of the condenser component. In an embodiment, the condenser component is a tube, coil, fin, or vane. In an embodiment, the liquid metal solution is a silver solution. In an embodiment, the silver solution is silver nitrate. In an embodiment, the contacting is immersion in the metal solution. In an embodiment, the contacting is spraying at least one surface of the condenser component with a metal solution. The method further comprises depositing a self-assembly monolayer of a polymer on the treated condenser component. The polymer can be a hydrocarbon polymer or a fluorocarbon polymer. In an embodiment, the self-assembly monolayer can be 1-dodecanethiol.

A further embodiment includes a method of forming a condenser system as disclosed herein. In an illustrative embodiment, at least one vapor condensing surface is etched. The surface is initially cleaned with deionized water and then dried with compressed air. Once dry, the surface is submerged into an acid solution for 5 minutes. In an embodiment, the acid solution comprises a 1:1 mixture (by weight) of 70 wt % nitric acid and 1 M sulfuric acid.

EXAMPLES

Coated copper alloy tubes were produced according to methods disclosed herein and tested for surface properties.

Silver Nano-Particle Deposition:

Copper alloy 122 tubes with an outside diameter of 15.9 mm and a thickness of 0.813 mm were primary surface-treated by using emery sand paper (#320) and subsequently by wire wool. The tubes were thoroughly rinsed with deionized water and ethanol. To prepare aqueous silver nitrate stock solution, silver nitrate (99.9% metal basis, Alfa Aesar) was dissolved in DI water at different concentrations (1-100 mM). Silver self-assembled nano particles were introduced via a wet chemistry process. Scalability of silver nano particle was governed by a self-assembly process, which was proportional to concentration of silver nitrate and immersion time. Silver self-assembled nano particles (SANPs) were examined by Field Emission-Scanning Electron Microscopy (FE-SEM) and Energy Dispersion X-ray (EDX).

Water Contact Angle (WCA) Measurements:

The contact angles of liquids (i.e. water, methyliodide) on the surfaces were measured by a CAM-100 type contact angle apparatus (KSV Instruments, Finland) with an accuracy of ±0.5° at room temperature to assess wetting characteristics. A standard syringe was used to introduce approximately a volume of 5 µl drop onto the surfaces.

Surface Energy Measurements:

Surface energies of different surface-treated coatings were estimated from the WCA measurements using two different fluids: water ($H_2O$) and methylene iodide ($CH_2I_2$).

Figure 2:
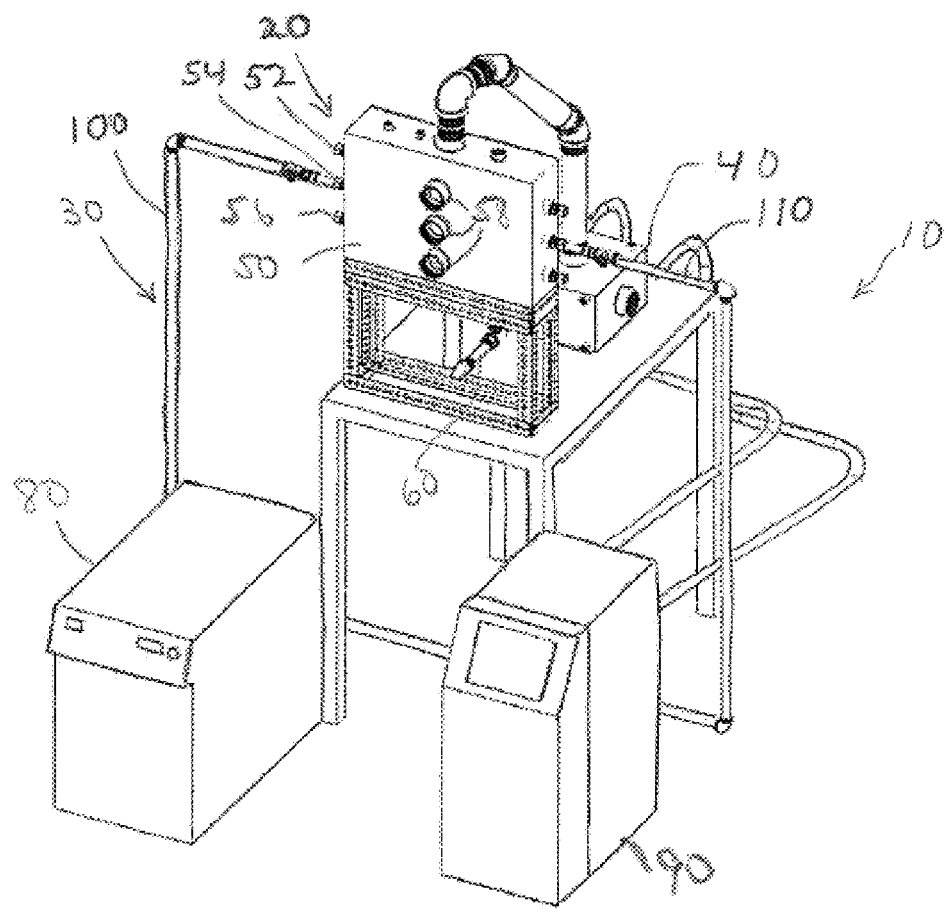
FIG. 2 is a schematic view of a condensation heat transfer experimental setup.
Figure 2A:
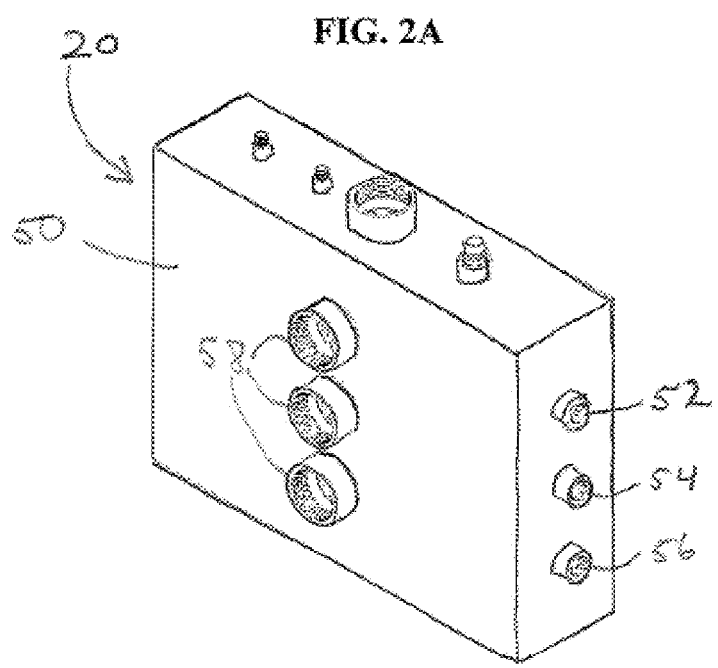
FIG. 2A is a schematic view of a detail of a condenser of FIG. 2.

Condensation Heat Transfer Experiments:

Several surface-treated tubes were used in external condensation tests using the experimental setup shown in FIGS. 2 and 2A. The test setup 10 consisted of three main parts: a test section 20, a cooling loop 30, and a boiler 40. The test section 20 is composed of a condensing chamber 50 housing three condensing tubes 52, 54, 56, view ports 58, valves with plumbing 60, and measuring instruments 70 (not shown). The cooling loop 30 consisted of a chiller/circulator (Affinity, RWE-012K) 80 and the outlet temperature of which can be maintained within ±1° C. of the present value. The boiler 40 generated steam by a submerged heating coil (not shown). Hot compressed water controlled by a heater (Advantage Engineering, Sentra SK-1035 HE) 90 was flowing inside of the heating coil of the boiler 40 to generate steam. The coolant temperatures of the inlet 100 and outlet 110 were measured by resistance temperature detectors (RTDs, OMEGA, class A, ±0.35° C.), and the chamber 50 and steam temperatures were measured by T-type thermocouples (±0.5° C.). The pressure of the chamber 50 and boiler 40 were measured by pressure transducers (AST, AST4300, 0-345 kPa, ±0.5%). The coolant flow rate was measured by a rotameter (Blue & White, F-440, 0-5 GPM, ±4% of full scale).

Before the test run, the condensing chamber 50 was fully evacuated until the water could boil at vacuum pressure. Non-condensable gases can be expelled to the atmosphere. Once the system reached a steady state condition, relevant heat transfer data were acquired. Pressure and coolant inlet temperature were controlled at 97.8-67.5 kPa and 50-90° C. during data acquisition.

Results and Discussion

Surface Characterization:

Produced SANPs at different concentrations were examined by FE-SEM and EDX. As shown in FIGS. 3A-D, the size of individual SANPs was scalable by varying concentration of stock solutions and immersion time. Each nano particle had a characteristic faceted crystal and the average size of SANP was 200 nm-3 μm.

Figure 4:
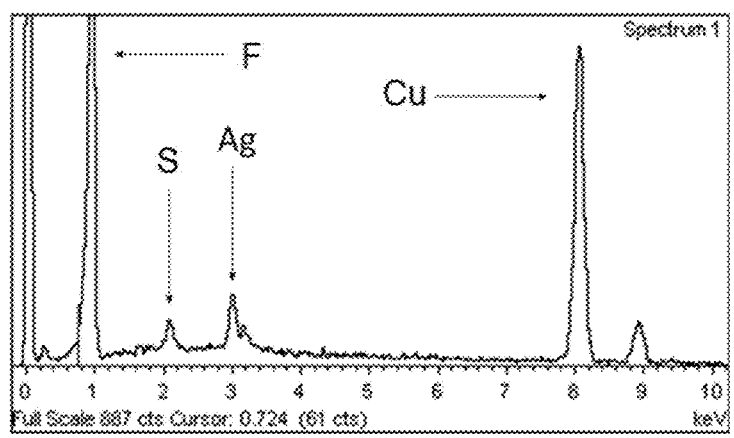
FIG. 4 is a graph showing EDX element mapping of Kα and Lα peaks of fluorine, sulfur, copper, and silver at 0.525 and 2.984 keV, respectively. The approximate atomic ratio is Ag:O=1:1.
Figure 5A:
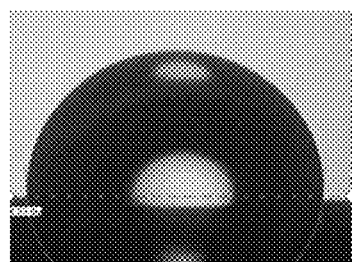
FIG. 5A is a photograph of static water contact angle ("SWCA") measurement of SANP on copper tubes (prior to dodecanethiol coating) of a 1 mM Ag solution (SWCA=93°)
Figure 5B:
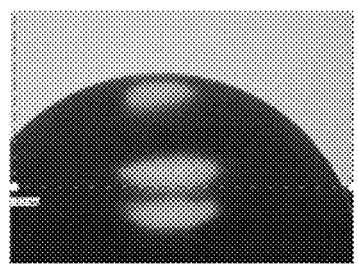
FIG. 5B is a photograph of SWCA measurement of SANP on copper tubes (prior to dodecanethiol coating) of 10 mM Ag solution (SWCA=63°).
Figure 5C:
FIG. 5C is a photograph of SWCA measurement of SANP on copper tubes (prior to dodecanethiol coating) of 100 mM Ag solution (SWCA=53°).
Figure 5D:
FIG. 5D is a photograph of SWCA measurement of SANP on copper tubes (prior to dodecanethiol coating) of (d) 100 mM Ag solution (SWCA=31°).
Figure 6A:
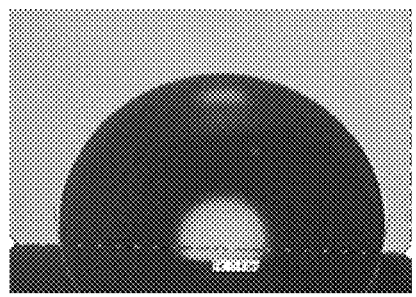
FIG. 6A is a photograph of SWCA measurement of dodecanethiol (1 w/w) SAM-coated SANP on copper tubes of 1 mM Ag solution (water contact angle ("WCA")=101°).
Figure 6B:
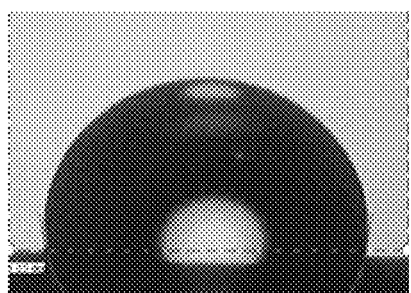
FIG. 6B is a photograph of SWCA measurement of dodecanethiol (1 w/w) SAM-coated SANP on copper tubes of 10 mM Ag solution (WCA=101°).
Figure 6C:
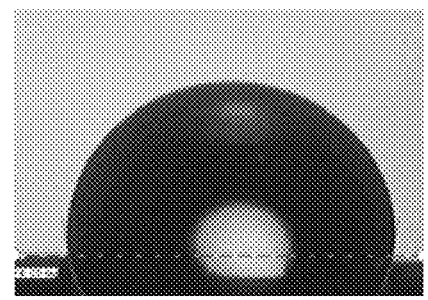
FIG. 6C is a photograph of SWCA measurement of dodecanethiol (1 w/w) SAM-coated SANP on copper tubes of 100 mM Ag solution (WCA=100°).
Figure 6D:
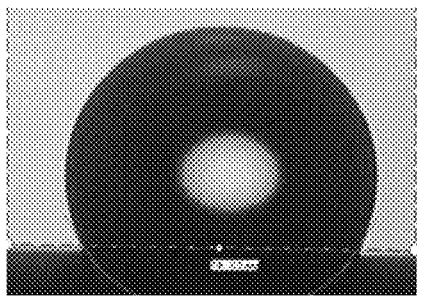
FIG. 6D is a photograph of SWCA measurement of dodecanethiol (1 w/w) SAM-coated SANP on copper tubes of 100 mM Ag solution (WCA=120°).

For elemental analysis, EDX mapping was executed in FIG. 4. The majority of elements consists of fluorine, sulfur, copper, and silver. In aqueous silver nitration solution, silver and nitrate were ionized. Individual ions interacted with copper and eventually crystallize into silver: $Cu_{(s)} + 2Ag^+_{(aq)} + 2NO_3^-_{(aq)} \rightarrow 2Ag_{(s)} + Cu(NO_3)_{2(aq)}$.

WCA Measurements:

Surface wetting is closely related to surface roughness and surface energy. Scalability of SANPs influences surface wetting, which was visualized by Static Water Contact Angle (SWCA) in FIGS. 5A-D. The reference surface (plain copper surface) has a SWCA of approximately 77°. As SANP concentration increased (1-100 mM), the SWCA decreased. It is assumed that enhanced wetting phenomena was caused by hydrophilic SANP surface profiles and led to the Wenzel effect.

As shown in FIGS. 3A-F, scalable nano- and micro-bumps on the substrate can lead to surface wetting transition from a Wenzel (wetting) surface to a Cassie-Baxter (less wetting) surface due to hydrophobic coating. In general, a hydrophobic coating prevents liquid impingement into surface profiles and entraps noncondensible gas into surface roughness. Dodecanethiol consists of a hydrophobic carbon backbone, which lowers surface energy and leads to hydrophobicity. Dodecanethiol (1 w/w) was dissolved in ethanol and was spray-coated several times.

As shown in FIGS. 6A-D, a hydrophobic coating dramatically increased SWCA (≥100°). This result implies that a hydrophobic coating prevents liquid from impinging into surface roughness. A hydrophobic coating leads to a surface wetting transition from a Wenzel surface to a Cassie-Baxter surface by entrapping gas. Most surfaces showed SWCA of 100°. This phenomenon was assumed to be related to surface profiles as shown in FIGS. 3A-F. Density of micro bumps at given surface area increased with silver concentration. However, aspect ratio of micro bumps is not significantly enhanced until exposure time increases. To improve SWCA of structured-surfaces, aspect ratio of the substructure was assumed to be the key (B. J. Zhang, K. J. Kim, H. K. Yoon, Bioinsp. Biomim. 7, 036011 (2012); C. Y. Lee, B. J. Zhang, J. Y. Park, K. J. Kim, Int. J. Heat Mass Transfer 55, 2151 (2012)).

Surface Energy Measurements:

In order to obtain a hydrophobic surface, surface roughness and low surface energy were essential factors. The surface energy of SANP was estimated using the formula suggested by Owen and Wendt (D. K. Owen, R. C. Wendt, Appl. Polymer Sci. 13, 1741 (1967)):

$$\gamma = \gamma^h + \gamma^d \quad (1)$$

where $\gamma$ is the total surface energy. $\gamma^h$ is the surface energy component due to a hydrogen bonding and dipole-dipole interactions and $\gamma^d$ is a dispersion component of surface energy.

Figure 7A:
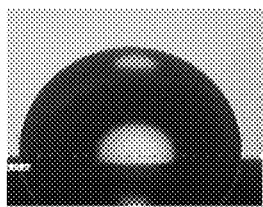
FIG. 7A is a photograph of an AWCA measurement with a plain surface-water liquid.
Figure 7B:
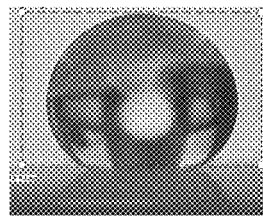
FIG. 7B is a photograph of an AWCA measurement with a plain surface-$CH_2I_2$ liquid.
Figure 7C:
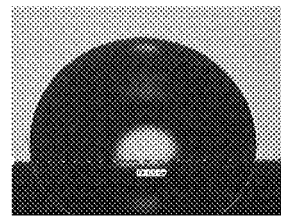
FIG. 7C is a photograph of an AWCA measurement with a SAM-coated surface-water liquid.
Figure 7D:
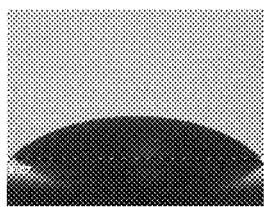
FIG. 7D is a photograph of an AWCA measurement with a SAM-coated-$CH_2I_2$ liquid.
Figure 7E:
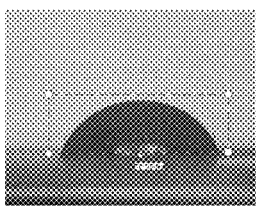
FIG. 7E is a photograph of an AWCA measurement with a SANP-coated surface-water liquid.
Figure 7F:
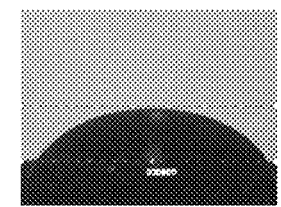
FIG. 7F is a photograph of an AWCA measurement with a SANP-coated surface-$CH_2I_2$ liquid.

As shown in FIGS. 7A-F, the SWCA of various surfaces (a plain copper surface and self-assembly monolayer of copper) are shown for comparison. For water, a wide range of SWCA (77°-157°) occurred (FIGS. 7A-C). For methylene iodide, SWCAs were almost halved (33°-75°) compared to water (FIGS. 7D-F). Obtained results of SWCA measurements are summarized in Table 2.

To obtain the surface energy using Eq. (1), individually measured SWCAs of different polar liquids were plugged into empirical formulations suggested by Baojin et al. (Q. Baojin, Z. Li, X. Hong, S. Yan, Exp. Therm. Fluid Sci. 35, 211 (2011)):

$$\gamma^h = \left( \frac{137.5 + 256.1 \cos\theta_{H_2O} - 118.6 \cos\theta_{CH_2I_2}}{44.92} \right)^2 \quad (2)$$

$$\gamma^d = \left( \frac{139.9 + 181.4 \cos\theta_{CH_2I_2} - 41.5 \cos\theta_{H_2O}}{44.92} \right)^2 \quad (3)$$

Estimated surface energies of various surfaces are summarized in Table 2. For a SANP, the surface energy was significantly lower (45%) than that of a plain surface.

TABLE 2

Estimated surface energy for various surfaces

|  | Plain surface | SAM-coated surface | SANP-deposited surface |
|---|---|---|---|
| $\theta_{H_2O}$ (°) | 77 | 157 | 101 |
| $\theta_{CH_2I_2}$ (°) | 33 | 75 | 58 |
| $\gamma_{sv}$ (mJ/m$^2$) | 44 | 33 | 28 |

Figure 8A:
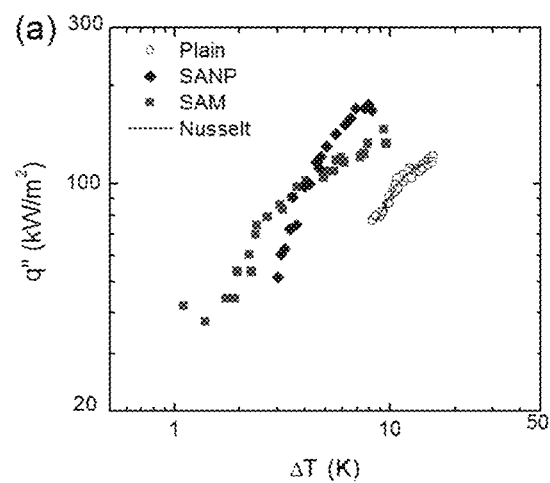
FIG. 8A is a graph showing results for external condensation test results of q" vs. $T_{sub}$.
Figure 8B:
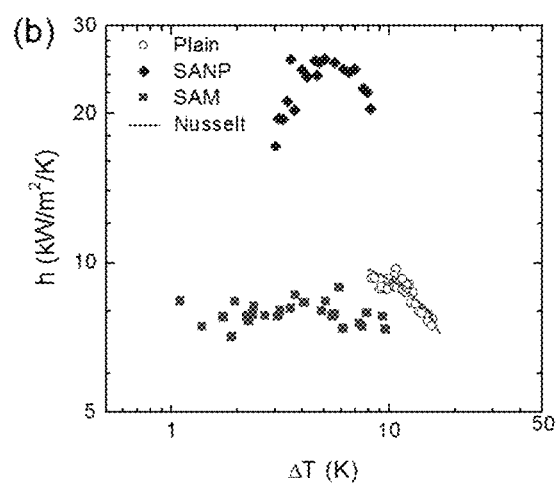
FIG. 8B is a graph showing results for external condensation test results of h vs. $T_{sub}$.

Condensation Results:

Test tubes (inner and outer diameters were 14.3 and 15.9 mm, respectively) were cleaned with acid solution (HCl:

HNO$_3$) to remove any organic residues. After acid cleaning, the tubes were thoroughly rinsed several times with distilled-water. A test tube was chemically treated with 10 mM Ag solution and 2 wt % ethanolic dodecanethiol was sprayed three times. As shown in FIGS. 8A-B, the temperature of subcool (T$_{sub}$) of the external condensation heat transfer tests results were plotted with respect to heat flux and the Condensation Heat Transfer Coefficient (CHTC). For comparison, the test results of the SANP-deposited condenser were compared to that of a plain copper tube and Self-Assembly Monolayer (SAM) of copper. The CHTC of the SANP-deposited condenser was approximately 2 to 2.5 times (100-150%) higher than non-surface treated (FIG. 8B). For SAM-coated condenser, CHTC was approximately 25% less than non-surface treated.

Figure 9A:
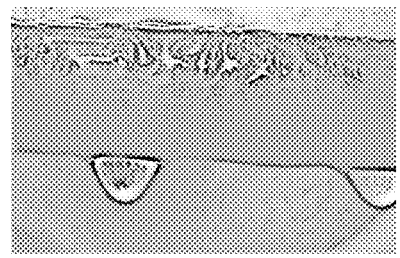
FIG. 9A is a photograph from a video-recording of a condensation experiment using a plain surface—FWC tube Scale bar represents 1 cm.

All test-runs of all the test tubes were recorded for condensation dynamics visualization. FIG. 9A shows a snapshot from the video-recording for a plain surface. Once initial condensate nucleates in the top part of tube, the condensate immediately begins to coalesce with adjacent ones and forms liquid patches. On the bottom of the tube, dangling condensates with a diameter up to 10 mm and height up to 9 mm were observed. After drop/droplet detachment, very thin residues remained on the surface. A dangling drop and thin liquid layer can play a role in thermal resistances. As heat flux increases, complete FWC appeared along the axial length of the tube.

Figure 9B:
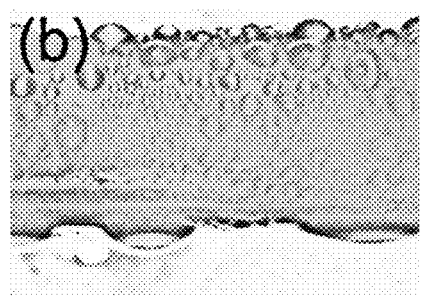
FIG. 9B is a photograph from a video-recording of a condensation experiment using a SAM-coated surface—mixed DWC and FWC tube. Scale bar represents 1 cm.

In FIG. 9B, A SAM-coated surface had a different condensation pattern compared to that of a plain surface (FIG. 9B). In general, a hydrophobic coating provided nucleation site improvement. In the top part of the tube, numerous condensates nucleated and coalesced with neighboring condensates. Due to enhanced surface tension on the droplet rim, a sweeping mode was prevented and droplets grew horizontally. The residing droplet retarded the nucleation of condensates and deteriorated heat transfer performance. Similar phenomena were observed on the bottom of the tube. To note, a larger droplet dangling on the surface turned into a liquid patch, which induced FWC.

Figure 9C:
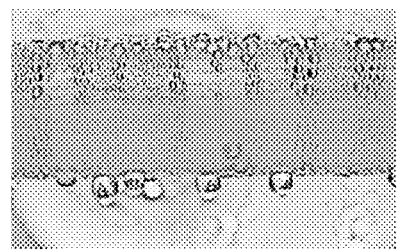
FIG. 9C is a photograph from a video-recording of a condensation experiment using a SANP-deposited surface—DWC tube. Scale bar represents 1 cm.

Still-frame of the SANP-deposited surface in FIG. 9C shows DWC mode throughout the horizontal tube. Significant rolling-off motion refreshed the entire surface and triggered immediate nucleation of tiny condensates. The average diameter of detaching condensates was estimated to be approximately 3 mm. The SWCA was not a critical factor in determining DWC mode. As shown in FIGS. 7B-C, the SAM copper oxide was 50% enhanced WCA compared to the SANP. Once the cavity of the superhydrophobic surface becomes wet, additional driving force and/or energy are required. During condensation test, most of superhydrophobic surface showed strong WCA hysteresis, which restricted rolling-off motion and condensate detachment.

Figure 10A:
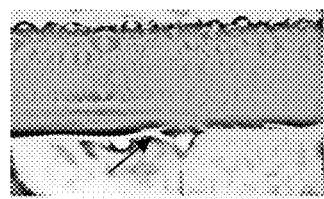
FIG. 10A is a photograph frame from a video of DWC of the SAM copper oxide at $T_{sub}$~5.2, with a condensate diameter of 3.3 mm and height (mm) of t*=2.06 (t=33 ms).
Figure 10B:
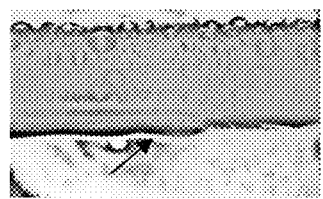
FIG. 10B is a photograph frame from a video of DWC of the SAM copper oxide at $T_{sub}$~5.2, with a condensate diameter of 3.3 mm and height (mm) of t*=4.13 (t=66 ms).
Figure 10C:
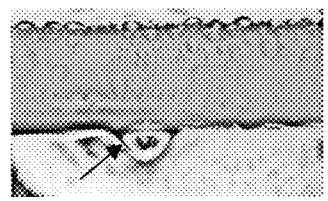
FIG. 10C is a photograph frame from a video of DWC of the SAM copper oxide at $T_{sub}$~5.2, with a condensate diameter of 3.3 mm and height (mm) of t*=29.13 (t=466 ms).
Figure 10D:
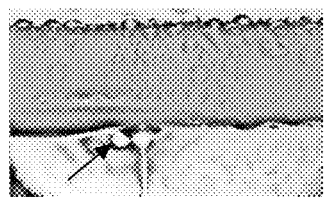
FIG. 10D is a photograph frame from a video of DWC of the SAM copper oxide at $T_{sub}$~5.2, with a condensate diameter of 3.3 mm and height (mm) of t*=35.38 (t=566 ms).
Figure 11A:
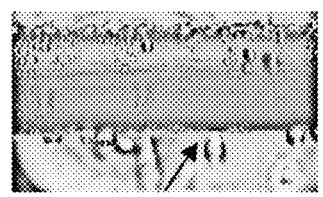
FIG. 11A is a photograph frame from a video of DWC of the SAM copper oxide at $T_{sub}$~5.2, with a condensate diameter of 3.3 mm and height (mm) of t*=2.06 (t=33 ms).
Figure 11B:
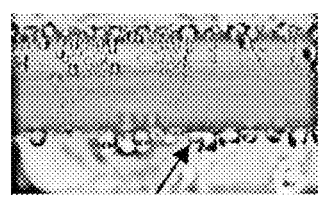
FIG. 11B is a photograph frame from a video of DWC of the SAM copper oxide at $T_{sub}$~5.2, with a condensate diameter of 3.3 mm and height (mm) of t*=47.9 (t=766 ms).
Figure 11C:
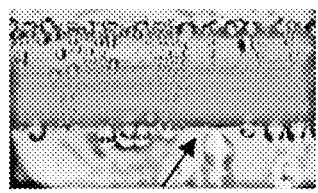
FIG. 11C is a photograph frame from a video of DWC of the SAM copper oxide at $T_{sub}$~5.2, with a condensate diameter of 3.3 mm and height (mm) of t*=54.1 (t=866 ms).
Figure 11D:
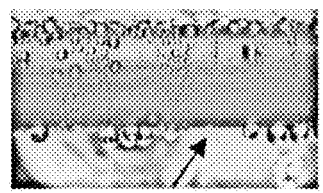
FIG. 11D is a photograph frame from a video of DWC of the SAM copper oxide at $T_{sub}$~5.2, with a condensate diameter of 3.3 mm and height (mm) of t*=56.2 (t=900 ms).

To analyze dynamic condensate movement, the growth period of the condensates was video-recorded and was normalized using the characteristic length (l$_0$), velocity (u$_0$), and time (t$_0$) defined as (] Y. Nam, E. Aktinol, V. K. Dhir, Y. S. Ju, Int. J. Heat Mass Transfer 54, 1572 (2011)):

$$l_0 = \sqrt{\frac{\sigma}{g(\rho_l - \rho_v)}} \quad (4)$$

$$u_0 = \sqrt{g \cdot l_0} \quad (5)$$

$$t_0 = \frac{l_0}{u_0} \quad (6)$$

$$t^* = \frac{t}{t_0} \quad (7)$$

where σ, g, ρ$_l$, and ρ$_v$ are surface tension, gas constant, and density of liquid and solid, respectively.

t$_0$=1.6×10$^{-2}$ s and l$_0$=2.5×10$^{-3}$ m was calculated for water at 1 atm. In FIG. 10A, the flow-visualization of the SAM-copper oxide surface showed condensate (arrowed) detachment at t*=2.06. During detachment, the film partially detached (see the next frame FIG. 10B). Then, the droplet grew horizontally and vertically. At t*=35.38, the droplet was removed from the surface again (FIG. 10D). The detachment frequency was approximately 1.7 Hz. The drop-visualization of the SANP surface is shown in FIGS. 11A-D. At t*=2.06, a droplet-shaped condensate (arrowed) was removed from the test tube. At the same spot, several condensates are shown in FIG. 11B. These condensates instantaneously merged and detached from the surface. Consecutive frame (FIG. 11D) shows that there is nearly no residue left after detachment. The detachment frequency was approximately 1.1 Hz (faster than the SAM copper oxide). The SANP surface significantly increased droplet-detachment frequency and also minimized the droplet-residuals, which led to an increase in condensation heat transfer.

Figure 12A:
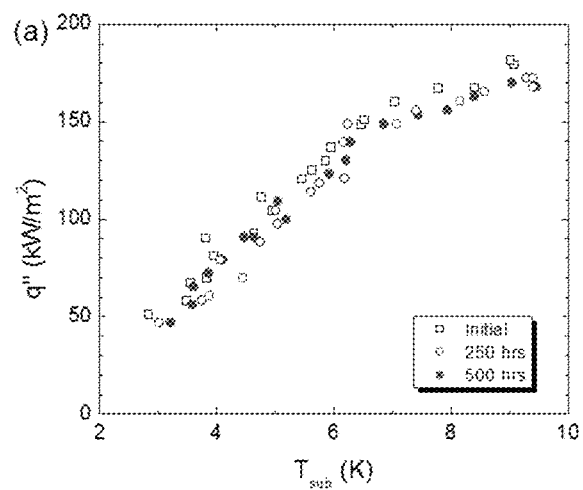
FIG. 12A is a graphic representation of long term performance of the SANP tubes during 500 hour test runs of q" vs $T_{sub}$.
Figure 12B:
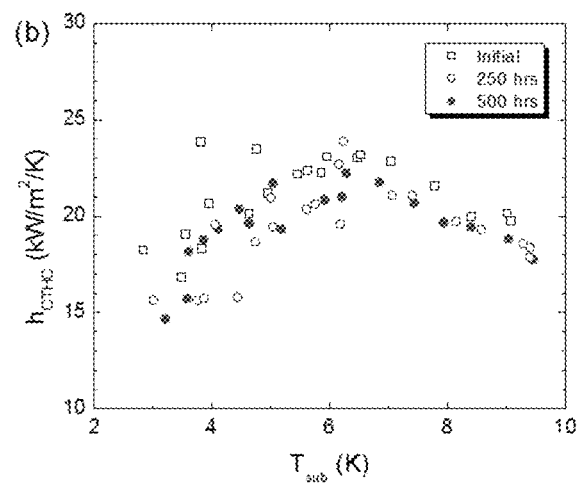
FIG. 12B is a graph of long term performance of the SANP tubes during 500 hour test runs of h vs $T_{sub}$.

To check long term performance of the SANP tubes, longevity test was performed for a 500 hours test run. As shown in FIG. 12A, heat flux over subcool temperature was rarely influenced after 500 hours test run. Heat flux information was converted into a condensation heat transfer coefficient (CHTC) and compared to the initial condition in FIG. 12B. There was no significant change of the SANP-deposited surface after 100 hours of operation.

FIGS. 13A-H depicts the contour of liquid condensate distributions of the silver-coated surface, which were taken at specified time periods. FIG. 13A shows that discrete liquid condensates coalesced rolling off along the horizontal tube. Once the liquid droplet began to roll off, the mean base radius was approximately 2 mm. As the liquid droplet moved along the tube surface, its mean base radius increased to about 3 mm. Growing liquid condensate swiveled around and removed premature liquid condensates (<1 mm) before reaching the critical radius to have enough momentum to roll off. The time frames of FIG. 13A-H show the renewal area. Instantaneously, micro-sized liquid condensates nucleated over the condensing surface, as shown in FIG. 13B.

Considering that the contour of the liquid condensates was outlined based upon a visually identifiable size, there might have been millions of unidentified liquid condensates. In FIGS. 13E-F, numerous liquid condensates densely populated the given surface area. Before the liquid droplets were fully grown, the largest droplet began to roll off and swivel around the adjacent premature liquid droplets, as shown in FIGS. 13G-H.

The histogram shown below the contour map in FIGS. 13I-L represents the amount of condensate droplet population. In FIG. 13I, droplets were distributed widely since large condensates were swept already. Once nucleation began (FIGS. 13C-D), liquid droplets grew homogeneously, and the population histogram localized within a few microns regime (FIG. 13J). As droplets grew, the localized histogram peak diminished (FIG. 13K). The histograms shifted and were broadly distributed on a wide range of droplet radii. As shown in FIG. 13L, by immediately merging adjacent liquids, population peaks decreased significantly and histograms populated widely (200-2,000 μm).

What is claimed is:

1. A method of forming a condenser system, the method comprising
   contacting a copper or copper alloy surface with a silver nitrate solution to deposit silver particles thereon to form a treated metal, and
   subsequently applying a self-assembled monolayer to the treated metal,
   wherein the water contact angle of the treated metal after applying the self-assembled monolayer is about 63° to about 93°, and
   wherein the silver particles are in a layer of about 1 μm or less.

2. The method of claim 1, wherein the self-assembled monolayer is formed from either a hydrocarbon or fluorocarbon.

3. The method of claim 1, wherein the self-assembled monolayer is formed from 1-dodecanethiol.

4. The method of claim 1, wherein the vapor condensing surface after the step of depositing has a surface energy of less than about 40 mJ/m².

5. The method of claim 1, wherein the vapor condensing surface after the step of depositing has a surface energy of less than about 30 mJ/m².

6. The method of claim 1, wherein the concentration of silver nitrate in the silver solution is about 1 mM to about 50 nM.

7. The method of claim 1, wherein the vapor condensing surface after the step of depositing has a condensate detachment frequency of about 0.5 Hz to about 2.0 Hz.

8. The method of claim 1, wherein the self-assembled monolayer is formed from a silane.

* * * * *